Oct. 26, 1926.
A. E. DRISSNER
1,604,116
METAL WORKING MACHINE
Filed May 12, 1925     2 Sheets-Sheet 2
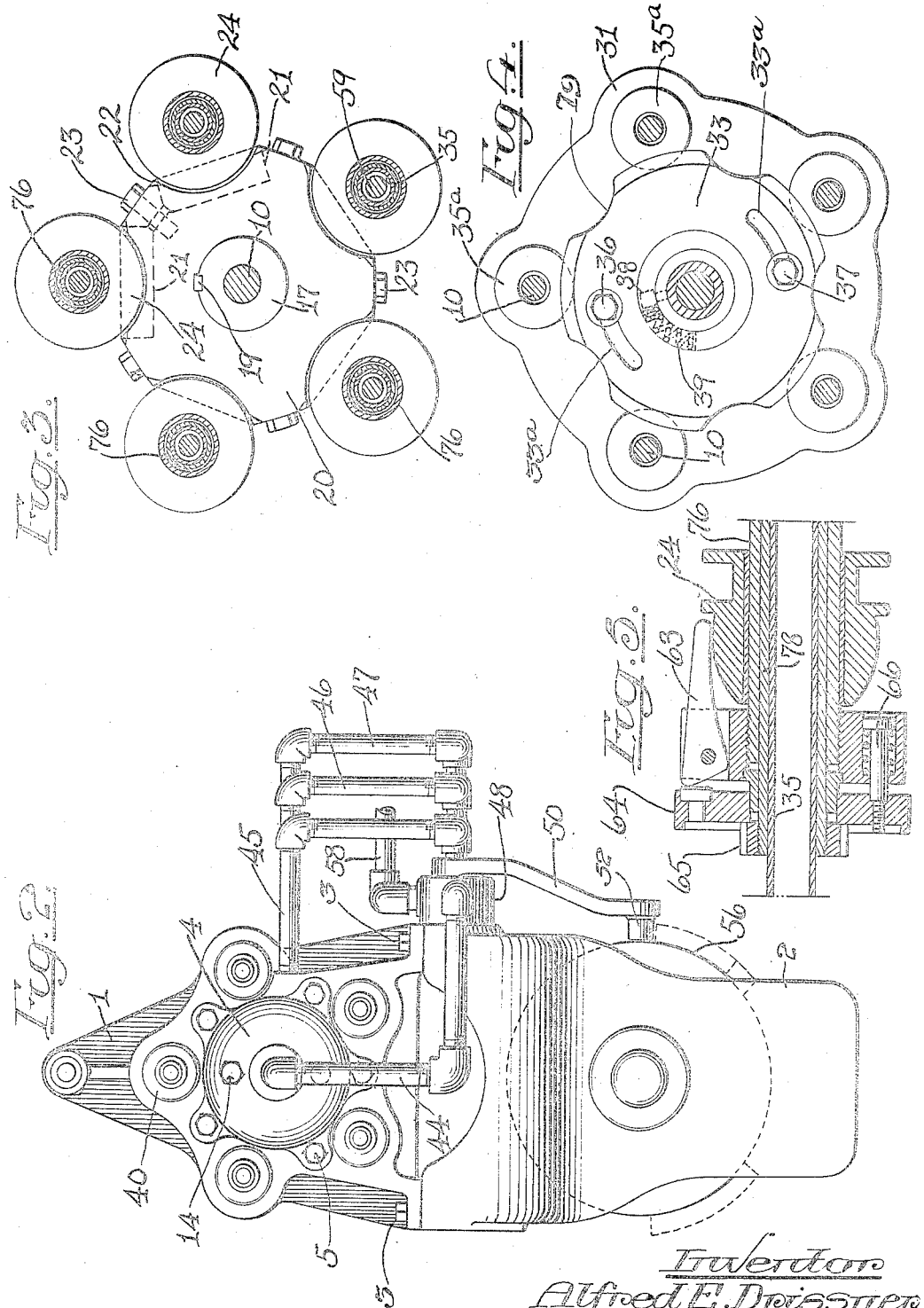

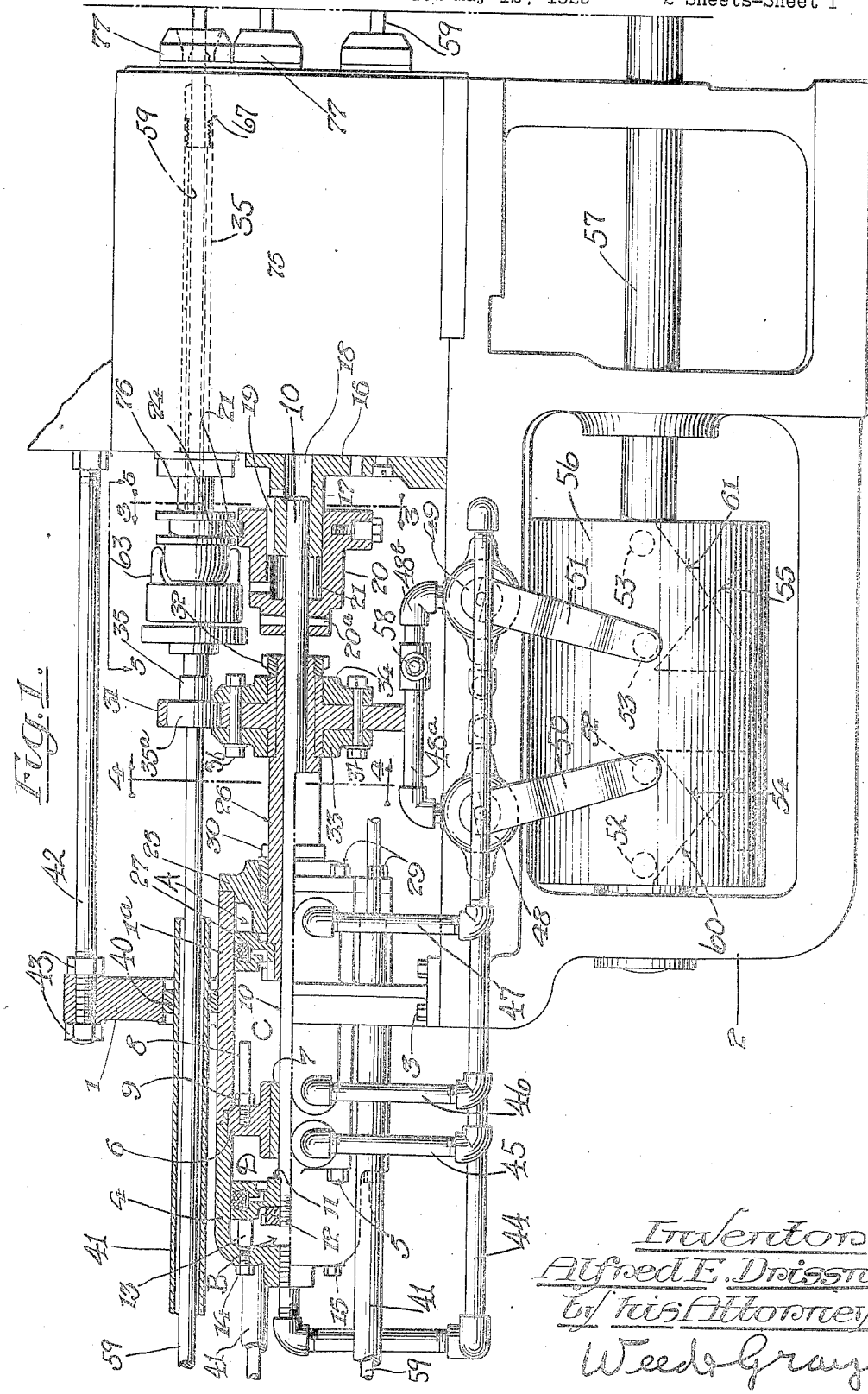

Patented Oct. 26, 1926.

1,604,116

UNITED STATES PATENT OFFICE.

ALFRED E. DRISSNER, OF CLEVELAND, OHIO, ASSIGNOR TO THE NATIONAL ACME COMPANY, OF CLEVELAND, OHIO, A CORPORATION OF OHIO.

METAL-WORKING MACHINE.

Application filed May 12, 1925. Serial No. 29,686.

This invention relates to metal working machines such as single spindle or multiple spindle screw machines, or other machines of this class wherein provision is made for feeding stock or stock bars and chucking the same, an object of the invention being to provide an improved chucking mechanism and stock feeding mechanism which are fluid or air operated, and in which the fluid operated mechanism for controlling the chucking and feeding of the stock is automatically operated as by means of cam mechanism.

A further object of this invention is to provide an improved metal working machine, such as a single spindle or multiple spindle screw machine having improved fluid operated mechanism for feeding the stock through the spindle.

Other objects of this invention will appear in the following description and appended claims thereof, reference being had to the accompanying drawings forming a part of this specification, wherein Fig. 1 is a side elevation partly broken away and partly in section illustrating the invention as applied to a multiple spindle machine; Fig. 2 is a rear end elevation of the construction shown in Fig. 1; Fig. 3 is a sectional view taken substantially on lines 3—3 of Fig. 1; Fig. 4 is a sectional view taken substantially on lines 4—4 of Fig. 1; and Fig. 5 is a longitudinal sectional view taken through the spindle substantially on lines 5—5 of Fig. 1.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

In the present invention fluid or air controlled mechanism is provided for both opening and closing the chuck of each spindle and for feeding the stock through the spindle to the chuck. In its preferred form the construction comprises in general a reciprocating chuck operating tube located in each spindle, and a reciprocating feed tube located in each spindle. A pair of cylinders are mounted exteriorly of the spindle or spindles and a piston is located within each cylinder, one piston connected to the chuck operating tube, and the other piston connected to the feed tube. A central air or fluid intake is provided which conducts the fluid to a pair of independent valves, and each valve having conduits for directing fluid or air to the opposite sides of a piston. Cam mechanism is provided for opening and closing the valves, and this mechanism is so timed that the pistons will be operated at such times as to accomplish the feeding of the stock and the opening and closing of the chuck at the desired times.

Referring to the drawings, the present machine comprises a suitable frame 2, and mounted on the rear end of this frame is an upwardly extending bracket 1 suitably bolted thereon at 3. The bracket 1 intermediate the top and bottom thereof is preferably constructed to form a cylinder 1ª having portions extending in front of and in rear of the main portion of the bracket as shown in Fig. 1. The cylinder 1ª is suitably machined so as to receive a rear cylinder 4, which is secured thereto by means of screws 5. The cylinder 4 is counterbored to receive a spacer member 6, which is securely held in position so as to space the front cylinder 1ª from the rear cylinder 4. The spacer 6 is centrally bored and fitted with a bushing 7, and is also provided with a tapped hole to receive a strop rod or stud 8 which is locked in adjusted position by means of a nut 9.

A sliding rod 10 extends freely through the bushing 7, and the rear end of this rod is turned down to provide a shoulder, and a piston 11 is mounted on the rod so as to abut against this shoulder. The piston is securely held in position by means of a nut 12 threaded on to the end of the rod 10. The rear end of the cylinder 4 is tapped to receive a pair of stop rods or studs 13, which extend into the cylinder in the direction of the piston 11, and these studs are adjustably held in position by means of nuts 14 and 15.

Mounted on the forward end of the frame 2 is a cylinder or spindle carrier 75, this carrier in the present instance being stationary or non-rotatable. Suitably mounted in the spindle carrier 75 are a plurality of rotary spindles 76, five being shown in the present instance, and each spindle at its forward end is provided with stock holding means in the form of a chuck 77, which is adapted to be opened and closed for the purpose of releasing and gripping the stock.

Located within each spindle and extending therethrough is a chucking tube 78, which at its forward end is connected to the chuck 77 for opening and closing the same in a well known manner. Extending through each spindle and located within the chucking tube 78 is a feed tube 35 having at its forward end a feed collet or pusher 67.

Bolted on the rear face of the stationary head or spindle carrier 75 is a spider or bracket 16 having a rearwardly extending hub 17 bored at 18 to receive the forward end of the sliding rod 10, this rod freely sliding in the bore in the spider 16. The hub 17 of the spider is provided with a longitudinally extending key-way in which is secured a key 19. A chucking spider 20 is slidingly mounted upon the hub 17 of the bracket 16, the spider 20 being provided with a central bore 21 to receive the hub 17. This spider 20 is pinned at 20ª to the forward end of the sliding rod 10, and is provided with a key-way to receive the stationary key 19, whereby the spider will slide forwardly and rearwardly upon the hub 17 but will be held against turning movement thereon.

The spider 20 is machined to provide a series of five slots adapted to receive a corresponding number of chucking shoes 21, these shoes being held in the slots by means of wedges 22 and screws 23, and each shoe 21 projects into the groove of a chucking wedge 24.

A front cap 25 is mounted on the front end of the cylinder 1ª, this cap being bored to receive a sliding sleeve or tube 26. The rear end of the sleeve 26 is turned down to receive a piston 27, which is adapted to reciprocate in the cylinder 1ª, the rear end of the sleeve 26 being threaded to receive a nut which holds the piston securely in place. It will be noted that the sleeve 26 is bored to freely fit over the sliding rod 10, the sleeve 26 and rod 10 thus being telescoped, and each adapted to reciprocate independently of the other. The cap 25 is held in place by means of screws 29 and this cap is provided with a tapped holder for the reception of a packing nut 30, the packing being placed behind the nut 30 to prevent any air escaping from the cylinder 1ª.

The forward end of the sleeve 26 is turned down to receive the stock feed tube guide member 31, which is held in position on the sleeve by a suitable nut 32, this guide being provided with a rearwardly extending hub on which is mounted a feed disk 33 and a forwardly extending hub on which is mounted a pull-back disk 34. The guide 31 is also provided with equally spaced holes to receive the enlarged ends 35ª of the feed tubes 35, which revolve freely therein.

As shown in Fig. 4, the disk 33 is provided with elongated slots 33ª through which pass the cap screws 36 and 37. These screws are screwed through the guide 31 and disk 34, holding the parts in proper position, and the hub of the guide 31 is drilled to receive the end of a pin 38, the larger outer end of which extends into a curved milled slot in the disk 33. A spring 39 is located in this slot and is held under tension against the pin 38. The foregoing construction permits the removal of the feed tubes when desired, which is accomplished by loosening the bolts 36, which enables the disk 33 to be turned on the hub of the guide 31 until the curved notches 79 are alined with the heads 35ª of the feed tubes. The tubes may then be pulled out past the feed disk 33. As soon as the disk 33 is released the spring 39 will rotate the disk into normal position. It will also be noted that the spring 39 tends to maintain the disk in proper position in case the bolts 36 become inadvertently loosened.

The front cylinder 1ª is suitably bored to receive the stock tube bushings 40 which in turn are machined to receive the stock tubes 41. This cylinder is also drilled to receive a rod 42 securely held in place by lock nuts 43, this rod being secured to a front stationary portion of the machine and acting to support the bracket 1. The front cylinder 1ª is drilled and tapped to receive the ends of pipes 46 and 47, the pipe 46 conducting air to the rear side of the piston 27 and the pipe 47 conducting air to the front side of the piston 27. The rear cylinder 4 is also drilled and tapped to receive the ends of pipes or conduits 44 and 45, the pipe 44 directing air to the rear side of piston 11, and the pipe 45 directing air to the front side of piston 11. A pair of valves 48 and 49 are suitably secured to the machine frame 2, these valves being connected by means of intake pipes 48ª and 48ᵇ respectively, to a central air intake or inlet 58. The pipes or conduits 44 and 45 are connected to the valve 48, and pipes 46 and 47 are connected to the valve 49. A depending lever 50 is connected to the valve 48 and a similar lever 51 is connected to the valve 49, these levers at the lower ends thereof being provided with cam rollers 52 and 53, respectively.

The main cam shaft 57 of the machine is provided with a cam drum 56, and mounted on this drum in the proper positions are a plurality of cams 54, 55, 60 and 61. These cams are indicated in dotted lines in Fig. 1. The actual positions of the cams are not shown, it being understood that the cams will be secured on the cam drum 56 in alternating relation so as to operate the valves 48 and 49 at the desired intervals. The cams on the cam drum are indicated in their positions when commencing to operate against the cam rollers carried by the levers 50 and 51. In the operation of the present invention, and with the mechanism in the position shown in Fig. 1, the rotation of the cam shaft 57 which causes the rotation of cam drum 56, will bring the cam 55 into position to strike the roller 53, and as the roller travels along the face of cam 55, the lever 51 is swung so as to operate the valve 49. The air coming through the main inlet at 58 thereupon passes through pipe 47 into chamber A in front of the piston 27. The piston moves backward until it strikes the top stud 8, and inasmuch as the piston 27 is connected to sleeve 26, the latter is shifted rearwardly thereby causing the pull-back disk 34 engaging the heads 35ª of the feed tubes to shift the feed tubes 35 rearwardly. In this operation, the feed collets 67 slide rearwardly over the stock bars 59, the stock being gripped by the chucks 77.

When the work of the cutting tools is completed and the finished product is cut off, the cam 54 comes into position to engage the roller 52 thereby swinging the lever 50 and operating valve 48. At this point, air coming through the inlet 58 passes through valve 48 into pipe 44, and thence is directed into chamber B in rear of the piston 11. The piston 11 is moved forwardly until it strikes against the hub of spacer 6, and inasmuch as this piston is fastened to the rod 10, the spider 20 is also shifted forwardly, and by means of the chucking shoes 21, the wedges 24 are shifted over the spindles 76. This operation results in opening the chucks 77 and unchucking the stock. The operation in general is accomplished through the dropping of fingers 63 when the wedges 24 move away from these fingers. The dropping of the fingers 63 is caused by the action of spring plungers 66 in shifting the disk 64 forwardly, this disk being secured by a collar 65 to the rear end of the chucking tube 78. Thus, the forward movement of the disk 64 shifts the chucking tube 78 forwardly thereby opening the chuck and releasing its grip on the stock. A further detailed description of the chucking mechanism and the operation thereof is not deemed necessary herein, since the same is described in my Patent No. 1,465,257 dated August 21, 1923.

From the foregoing, it will be seen that the spider 20 provided with the five chucking shoes 21 engaging the wedges 24 on all five spindles operates in the present instance to simultaneously open and close all of the chucks.

After the opening of the chucks as above described, the stock feeding operation takes place. Cam 61 at the proper time comes into position to engage the roller 53 thereby swinging lever 51 in the opposite direction from its swinging movement caused by the cam 55. This operates the valve 49 causing the air to pass through pipe 46 into chamber C in rear of piston 27. The piston thereupon moves forwardly until it strikes against the hub or cap 25. The sleeve 26 is moved forwardly thereby simultaneously moving forwardly through the feed disk 33, the feed tubes 35. The forward movement of the feed tubes acts to feed the stock through the chucks, this being accomplished by the pushers or collets 67. By adjusting the stop studs 8, the length of feed of the stock may be adjusted, since it will be understood that the longer the stud 8, the shorter will be the travel or throw of the piston 27, and hence the distance the feed tubes 35 and collets travel will be correspondingly shortened. After the feeding operation is completed the cam 60 comes into position to engage roller 52, swinging the lever 50 in the direction opposite to that in which the lever is swung by the cam 54. This operates the valve 48 and the air is conducted through the pipe 45 into chamber D. The air pressure against the piston 11 will shift the latter rearwardly until it strikes the stop stud 13. This rearward movement of piston 11 shifts the chuck rod 10 rearwardly thereby shifting the wedges 24 against fingers 63. The action of the wedges results in spreading the fingers thereby shifting the chucking tubes 78 rearwardly and closing the chucks. At this point, the feeding and chucking operations have been completed and the cutting tools are brought into operation to perform the required work.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a metal working machine, the combination of a rotary spindle, a chuck carried thereby, chuck operating means carried by the spindle, stock feeding means carried by the spindle, fluid operated means for operating said chuck operating means and stock feeding means in sequence, valve mechanisms for controlling said fluid operated means in sequence, a rotary cam shaft, and cam mechanism carried thereby for controlling said valve mechanisms in sequence.

2. The combination of a spindle carrier, a plurality of spindles carried thereby, a chuck carried by each spindle, chuck operating means carried by each spindle, stock feeding means carried by each spindle, fluid pressure means for simultaneously operating all of said chuck operating means and simultaneously operating all of said stock feeding means in sequence, valve mechanism for controlling said fluid pressure means, and automatically operative means for controlling said valve mechanism in sequence.

3. The combination of a spindle carrier, a plurality of spindles carried thereby, a chuck carried by each spindle, chuck operating means carried by each spindle, stock feeding means carried by each spindle, fluid pressure means for simultaneously operating all of said chuck operating means and simultaneously operating all of said stock feeding means in sequence, valve mechanism for controlling said fluid pressure means, and automatically operative cam mechanism for controlling said valve mechanism in sequence.

4. The combination of a spindle carrier, a plurality of spindles carried thereby, a chuck carried by each spindle, chuck operating means carried by each spindle, stock feeding means carried by each spindle, fluid pressure means for simultaneously operating all of said chuck operating means and simultaneously operating all of said stock feeding means in sequence, valve mechanism for controlling said fluid pressure means, and rotary means for automatically controlling said valve mechanism.

5. In a metal working machine, the combination of a spindle carrier, a plurality of spindles carried thereby, a chuck carried by each spindle, chuck operating means carried by each spindle, stock feeding means carried by each spindle, and fluid operating means including means shiftable axially of the spindle carrier for operating said chuck operating means and stock feeding means.

6. In a metal working machine, the combination of a spindle carrier, a plurality of spindles carried thereby, a chuck carried by each spindle, chuck operating means carried by each spindle, stock feeding means carried by each spindle, fluid operating means including means shiftable axially of the spindle carrier for operating said chuck operating means and stock feeding means, and automatically controlled valve means for controlling the operation of said fluid operating means.

7. In a metal working machine, the combination of a spindle carrier, a plurality of spindles carried thereby, a chuck carried by each spindle, chuck operating means carried by each spindle, stock feeding means carried by each spindle, and fluid pressure means for operating said chuck operating means and stock feeding means and including means supported axially of the spindle carrier and located one behind the other and shiftable toward and from the spindle carrier.

8. In a metal working machine, the combination of a spindle carrier, a plurality of spindles carried thereby, a chuck carried by each spindle, chuck operating means carried by each spindle, stock feeding means carried by each spindle, and fluid pressure means for operating said chuck operating means and stock feeding means and including means supported axially of the spindle carrier and located one behind the other and shiftable toward and from the spindle carrier, said stock feeding and its operating means including means releasable to permit the withdrawal of the stock feeding means.

9. In a metal working machine, the combination of a spindle carrier, a plurality of spindles carried thereby, a chuck carried by each spindle, chuck operating means carried by each spindle, stock feeding means carried by each spindle, fluid pressure means comprising a piston chamber having piston means therein, and means extending from one end of said chamber and connected with the piston means and located in the axis of the carrier and having means carried thereby for operating said chuck operating means and stock feeding means.

10. In a metal working machine, the combination of a spindle carrier, a plurality of spindles carried thereby, a chuck carried by each spindle, chuck operating means carried by each spindle, stock feeding means carried by each spindle, fluid pressure means comprising a piston chamber having piston means therein, and means extending from one end of said chamber and connected with the piston means and located in the axis of the carrier and having means carried thereby for operating said chuck operating means and stock feeding means, said extending means comprising a pair of members one within the other.

11. In a metal working machine, the combination of a spindle carrier, a plurality of spindles carried thereby, a chuck carried by each spindle, chuck operating means carried by each spindle, stock feeding means carried by each spindle, fluid pressure means for operating said chuck operating means and stock feeding means and comprising a piston chamber, a pair of pistons therein, means connected with one piston and located between the cylinder and spindle carrier for operating the chuck operating means, and means connected with the other piston and also located between the cylinder and the spindle carrier for operating the stock feeding means.

12. In a metal working machine, the combination of a spindle carrier, a plurality of spindles carried thereby, a chuck carried by each spindle, chuck operating means carried by each spindle, stock feeding means carried by each spindle, fluid pressure means for operating said chuck operating means and stock feeding means and comprising a piston chamber, a pair of pistons therein, means connected with one piston and located between the cylinder and spindle carrier for operating the chuck operating means, means connected with the other piston and also located between the cylinder and the spindle carrier for operating the stock feeding means, valve mechanism for controlling each of said pistons, and means for automatically operating said valve mechanisms in sequence.

13. In a metal working machine, the combination of a spindle carrier, a plurality of spindles carried thereby, a chuck carried by each spindle, chuck operating means carried by the spindles, stock feeding means carried by the spindles, fluid operated means for simultaneously operating all of the chuck operating means and for simultaneously operating all of the stock feeding means, valve mechanism for controlling said fluid operated means, and automatically operative means for controlling said valve mechanism in sequence thereby to open the chucks, feed the stock thereto, close the chucks and move the stock feeding means into position to feed another portion of stock to the chucks.

14. In a metal working machine, the combination of a spindle carrier, a series of circularly located spindles carried thereby, a chuck carried by each spindle, chuck operating means carried by the spindles, stock feeding means carried by the spindles, fluid operated means for operating the chuck operating means and for operating the stock feeding means and including means located centrally of and between the spindles for shifting the stock feeding means and the chuck operating means, valve mechanism for controlling said fluid operated means, and means for controlling said valve mechanism in sequence thereby to open the chucks, feed the stock thereto, close the chucks and move the stock feeding means into position to feed another portion of the stock to the chucks.

15. In a metal working machine, the combination of a carrier, a plurality of rotatable spindles carried thereby, a chuck carried by each spindle, a stock feed tube extending through each spindle, a pair of cylinders each having a reciprocating piston, an operating member connected to one of said pistons and slidable axially of said carrier, means for connecting said operating member to each chuck, an operating member connected to the other piston and slidable axially of said carrier, means for connecting said last operating member to each of said feed tubes, and fluid means for reciprocating said pistons.

16. In a metal working machine, the combination of a spindle carrier, a plurality of rotary spindles carried thereby and each having a chuck, a stock feed tube extending through each spindle, a pair of reciprocating pistons, a pair of operating members telescopically mounted and slidable one relatively to the other, each operating member connected to a piston, one thereof connected to said chucks and the other to said feed tubes, and fluid means for reciprocating said pistons.

17. In a metal working machine, the combination of a spindle carrier, a plurality of rotary spindles carried thereby and each having a chuck, a stock feed tube extending through each spindle, a pair of reciprocating pistons, a pair of operating members telescopically mounted and slidable one relatively to the other, each operating member connected to a piston, one thereof connected to said chucks and the other to said feed tubes, fluid means for reciprocating said pistons, and cam mechanism timed to successively control said fluid means.

18. In a metal working machine, the combination of a rotary spindle having a chuck, a stock feed tube extending through said spindle, a pair of telescopically mounted relatively slidable members, one connected to said chuck for operating the same and the other connected to said feed tube for operating the same, and a pair of fluid operated means for independently shifting said operating members.

19. In a metal working machine, the combination of a rotary spindle having a chuck, a stock feed tube extending through said spindle, a pair of telescopically mounted relatively slidable members one connected to said chuck for operating the same and the other connected to said feed tube for operating the same, and a pair of fluid operated means for independently shifting said operating members, said fluid operated means each comprising valve mechanism, and a common fluid intake for said valve mechanisms.

20. In a metal working machine, the combination of a spindle carrier, a series of circularly located spindles carried thereby, a chuck carried by each spindle, chuck operating means carried by the spindles, stock feeding means carried by the spindles, fluid operated means for simultaneously operating all of the chuck operating means and for simultaneously operating all of the stock feeding means and including means located centrally of the spindles and between the same for shifting the stock feeding means and the chuck operating means, valve mechanism for controlling said fluid operated means, and automatically operative means for controlling said valve mechanism in sequence thereby to open the chucks, feed the stock thereto, close the chucks and move the stock feeding means into position to feed another portion of the stock to the chucks.

21. In a metal working machine, the combination of a spindle carrier, a series of circularly located spindles carried thereby, a chuck carried by each spindle, chuck operating means carried by the spindles, stock feeding means carried by the spindles, fluid operated means for operating the chuck operating means and for the operating the stock feeding means and including a pair of means located centrally of and between the spindles for shifting the stock feeding means and the stock operating means, the means for shifting the stock feeding means having a releasable connection therewith whereby the stock feeding means may be readily withdrawn from the spindles, valve mechanism for controlling said fluid operated means, and means for controlling said valve mechanism in sequence thereby to open the chucks, feed the stock thereto, close the chucks and move the stock feeding means in position to feed another portion of the stock to the chucks.

22. In a metal working machine, the combination of a spindle, a chuck carried thereby, chuck operating means, a stock feed tube carried by the spindle for feeding stock therethrough, fluid operated means including means engaging said feed tube for shifting the feed tube back and forth, said feed tube and its engaging means having one a releasable connection whereby the feed tube is readily removable from the spindle.

23. In a metal working machine, the combination of a spindle, a chuck carried thereby, chuck operating means, a stock feed tube carried by the spindle for feeding stock therethrough, fluid operated means including means engaging said feed tube for shifting the feed tube back and forth and including a shiftable member operative to release the feed tube thereby to permit the feed tube to be removed from the spindle.

24. In a metal working machine, the combination of a spindle, a chuck carried thereby, chuck operating means, a stock feed tube carried by the spindle for feeding stock therethrough, fluid operated means including means engaging said feed tube for shifting the feed tube back and forth and including a shiftable member operative to release the feed tube thereby to permit the feed tube to be removed from the spindle, and spring acting means for shifting said member into its feed tube engaging position.

25. In a metal working machine, the combination of a spindle carrier, a spindle therein, a chuck carried by the spindle, chuck operating means carried by the spindle, stock feeding means also carried by the spindle, and fluid pressure means for operating said chuck operating means and stock feeding means, said stock feed operating means having means shiftable to permit the withdrawal of the stock feeding means from the spindle.

26. In a metal working machine, the combination of a spindle carrier, a spindle therein, a chuck carried by the spindle, chuck operating means carried by the spindle, stock feeding means also carried by the spindle, fluid pressure means for operating said chuck operating means and stock feeding means, said stock feed operating means having means shiftable to permit the withdrawal of the stock feeding means from the spindle, valve mechanisms for controlling said fluid pressure means, a rotary cam shaft, and means carried thereby for operating said valve mechanisms in sequence.

27. In a metal working machine, the combination of a spindle, a stock feed tube carried thereby and having a head at the rear end thereof, means for shifting said feed tube and including a shiftable member engaging said head and shiftable to release said head and thereby permit the withdrawal of the feed tube.

28. In a metal working machine, the combination of a spindle, a stock feed tube carried thereby and having a head at the rear end thereof, means for shifting said feed tube and including a shiftable member engaging said head and laterally shiftable to release said head and thereby permit the withdrawal of the feed tube.

29. In a metal working machine, the combination of a spindle, a stock feed tube carried thereby and having a head at the rear end thereof, means for shifting said feed tube and including a shiftable member engaging said head and shiftable to release said head and thereby permit the withdrawal of the feed tube, and spring acting means for automatically shifting said member laterally into its feed tube engaging position.

30. In a metal working machine, the combination of a spindle, a feed tube carried thereby, means for reciprocating said tube and including a feed disk and a pull back disk adapted to cooperate with said feed tube, the feed disk being shiftable laterally to release the tube and permit the same to be withdrawn.

31. In a metal working machine, the combination of a spindle, a feed tube carried thereby, means for reciprocating said tube and including a feed disk and a pull back disk adapted to cooperate with said feed tube, the feed disk being shiftable laterally to release the tube and permit the same to be withdrawn, and spring acting means for holding said feed disk in its feed tube engaging position.

32. In a metal working machine, the combination of a spindle, a stock feed tube carried by the spindle for feeding stock therethrough, and means for shifting said feed tube back and forth and including means having a releasable connection with said feed tube thereby to permit the feed tube to be readily removed from the spindle.

33. In a metal working machine, the combination of a spindle carrier, a series of circularly arranged spindles carried thereby, stock feed tubes carried by the spindles for feeding stock therethrough, means for shifting the feed tubes and including means located centrally of and between the feed tubes, said feed tubes and said centrally located means having one a releasable connection with the other whereby all of the feed tubes may be withdrawn from the spindles.

34. In a metal working machine, the combination of a spindle carrier, a series of circularly arranged spindles carried thereby, stock feed tubes carried by the spindles for feeding stock therethrough, means for shifting the feed tubes and including means located centrally of and between the feed tubes, said feed tubes and said centrally located means having one a rotatable releasable connection with the other whereby all of the feed tubes may be withdrawn from the spindles.

35. In a metal working machine, the combination of a spindle carrier, a series of circularly arranged spindles carried thereby, a chuck carried by each spindle, chuck operating means, stock feed tubes carried by the spindles for feeding stock therethrough, fluid operated means for operating the chuck operating means and for shifting the feed tubes and including means located centrally of and between the feed tubes and having a releasable connection with said feed tubes whereby the feed tubes may be readily withdrawn from the spindles.

Signed at Cleveland, Ohio, this 9th day of May, 1925.

ALFRED E. DRISSNER.